United States Patent [19]

Shibata

[11] Patent Number: 5,825,580
[45] Date of Patent: Oct. 20, 1998

[54] DATA RECORDING/REPRODUCING DEVICE AND BURST POSITION CONVERSION COEFFICIENT SETTING METHOD IN THE SAME

[75] Inventor: Satoshi Shibata, Tokyo, Japan

[73] Assignee: Kabushiki Kaisha Toshiba, Kawasaki, Japan

[21] Appl. No.: 712,327

[22] Filed: Sep. 11, 1996

[30] Foreign Application Priority Data

Feb. 29, 1996 [JP] Japan ................................ 8-043649

[51] Int. Cl.$^6$ ................................................ G11B 5/596
[52] U.S. Cl. .................................. 360/77.08; 360/77.02; 360/77.04
[58] Field of Search .................... 360/77.08, 75, 360/77.02, 77.04, 77.05

[56] References Cited

U.S. PATENT DOCUMENTS 5,210,662  5/1993  Nishijima .......................... 360/77.04
5,455,724  10/1995  Suzuki et al. ..................... 360/77.04

FOREIGN PATENT DOCUMENTS 5-234288  9/1993  Japan .

Primary Examiner—Aristotelis M. Psitos
Assistant Examiner—James L. Habermehl
Attorney, Agent, or Firm—Finnegan, Henderson, Farabow, Garrett & Dunner, L.L.P.

[57] ABSTRACT

A data recording/reproducing device for performing positioning control of at least one head using a plurality pairs of burst data recorded on a disk, comprises burst position conversion coefficient initial setting section for initially setting a burst position conversion coefficient, position information calculating section for calculating position information representing a head position shifted from a track center on the basis of one pair of the plurality pairs of burst data and a burst position conversion coefficient obtained at this time, positioning control section for positioning the head to an arbitrary position, at which the pair of burst data used for calculation of the position information can be detected, on the basis of the position information calculated by the position information calculating section, comparing section for comparing first position information indicating a current head position at which the burst position is detectable, with second position information after the head is moved to a predetermined position by the positioning control section on the basis of the first information, and burst position conversion coefficient adjusting section for adjusting the burst position conversion coefficient on the basis of a comparison result of the comparing section such that the difference between the first position information and the second position information is equal to or smaller than a predetermined value.

6 Claims, 6 Drawing Sheets

DATA RECORDING/REPRODUCING DEVICE AND BURST POSITION CONVERSION COEFFICIENT SETTING METHOD IN THE SAME

BACKGROUND OF THE INVENTION

1. Field of the Invention

The present invention relates to a data recording/reproducing device for controlling positioning of a head for recording/reproducing data on the basis of a plurality of pairs of burst data recorded on a disk and, more particularly, to a burst position conversion setting method for setting a position conversion coefficient used when head position information shifted from a track center is calculated on the basis of burst data.

2. Description of the Related Art

In a data recording/reproducing device, represented by, e.g., a magnetic disk device, for recording/reproducing data by a head, a scheme (positioning control by a so-called sector servo scheme) in which, on the basis of servo data recorded on a recording media, the head is controlled to be positioned to a designated position on the media is generally applied. The details of the positioning control of the sector servo scheme will be described below with reference to a magnetic disk device.

On the magnetic disk serving as a recording media, as shown in FIG. 1, a large number of tracks are concentrically formed in the radius direction. Each track is divided into a plurality of sectors (servo sectors) 100. Each servo sector 100 is constituted by a servo area 110 on which servo data used for positioning control or the like is recorded and a user area 120 (constituting a plurality of data sectors) on which data is recorded. Each servo area 110 is radially arranged from the center of the disk in the circumferential direction to traverse each track.

The servo area 110, as shown in FIG. 2, has known areas such as an AGC stabilized area (amplitude AGC area) 111 on which data having a predetermined frequency is recorded to stabilize the amplitude of a signal, a sector data area 112 on which sector data representing erase and a sector number (servo sector number) is recorded, a cylinder data area 113 on which cylinder data representing a cylinder number (cylinder address) is recorded, and a burst area 114 on which burst data (burst pattern) serving as data representing position information (position error in a cylinder indicated by cylinder data) by the amplitude of a waveform is recorded. Several methods of recording burst data are conventionally known. In this case, it is assumed that the burst area 114 is divided into four areas a, b, c, and d which are used to record position error signals (burst signals) A, B, C, and D, respectively. In this case, as shown in FIG. 3, the position error signals A and B are a pair of burst signals which are recorded at positions shifted from each other by a half track and have different phases, and the position error signals C and D are a pair of burst signals which are recorded at positions having a track center (Tc) as a reference and have different phases.

A servo processing system of the magnetic disk device moves the head to a target cylinder on the basis of cylinder data reproduced from the cylinder data area 113 by the head and burst data reproduced from the burst area 114 to finally position the head to the center of the target cylinder. The details of the servo processing system will be described below.

The peak values of head outputs (reproduced outputs of the position error signals A, B, and C) in areas a, b, c, and d of the burst area 114 are sample-held. When the burst outputs serving as the sample hold values are represented by A, B, C, and D, respectively, the relationship between differences (A−B) and (C−D) between the burst outputs and the head position (central position of the head) on the disk are shown in FIG. 4. As is apparent from FIG. 4, when the head is located near a position from X2 (position shifted from a center X3 of a track n by −¼ track) to X4 (position shifted from the center X3 of the track n by +¼ track), position information (head position shifted from the center X3 of the track n) normalized by (A−B)/(A+B) can be calculated.

However, the relationship between a track pitch Tp and a head width Tw generally satisfies Tp>Tw. Therefore, when the head is located near X5 (track boundary), B is always set to be 0 with respect to an area in which information of B cannot be detected. More specifically, a predetermined area near X5 serves as a blind sector with respect to misregistration of the head, and correct position information cannot be obtained near X5. For this reason, near X5, (C−D)/(C+D) is calculated by using C and D, so that position information with reference to X5 can be calculated.

However, the position information calculated as described above is larger than the actual amount of misregistration as shown in FIG. 5 because Tw is smaller than Tp. The position information must be multiplied by a position conversion coefficient (burst position conversion coefficient) K for converting burst data into position information to correct the position information. In this case, as K, a fixed value determined by Tw and Tp is used.

The servo processing system of the magnetic disk device feeds back the position information corrected by K to positioning-control the head to a target track. In this case, when the head is to be positioned to the center of the target track, positioning control is performed such that $\{(A-B)/(A+B)\} \times K = 0$ is satisfied.

As described above, in the data recording/reproducing device for performing positioning control of the head for recording/reproducing data on the basis of a plurality pairs of burst data recorded on the disk, burst position conversion coefficient must be set for each head.

In order to increase a recording density, the track pitch Tp and the head width Tw must be further decreased. However, the track pitch Tp and the head width Tw are decreased, the allowable error decreases accordingly. For this reason, a burst position conversion coefficient optimum for each head cannot easily set. In this case, the set position conversion coefficient is shifted from a true value to prevent a correct position from being detected, and the characteristics of positioning control may be degraded because the feedback gain of the servo processing system is shifted.

In a conventional device, it is necessary to prepare positioning control section for positioning a head to which two pair of position informations are equal, thereby a complex construction is required.

SUMMARY OF THE INVENTION

It is an object of the present invention to provide a magnetic disk device which can easily calculate a true value of a burst position conversion coefficient optimum for a head to be used and can correctly perform head positioning control free from an influence of a variation in head width even if a track pitch and a head width are small, and a burst position conversion coefficient setting method used in the magnetic disk device.

According to the present invention, in a data recording/reproducing device for performing positioning control of a head by using a plurality pairs of burst data recorded on a disk, after a burst position conversion coefficient serving as a reference is initially set; first position information representing an amount of misregistration of the head from a track center is calculated on the basis of one pair of the plurality pairs of burst data and a burst position conversion coefficient at this time; in a state wherein the head is positioned to an arbitrary target position in a burst output detectable band in which the pair of burst data used for calculating the position information can be detected, on the basis of the first position information, second position information representing a head position shifted from the track center is calculated on the basis of another pair of burst data (of the plurality pairs of burst data) which can be detected from the target position and a burst position conversion coefficient obtained at this time; the second position information and the first position information are compared with each other; if the difference exceeds a predetermined value, the burst position conversion coefficient is corrected to decrease the difference; and the above series of processes are repeated until the difference between the first position information and the second position information is equal to or smaller than the predetermined value.

In the present invention, in a state wherein the head is positioned to the target position on the basis of the first position information calculated on the basis of one pair of burst data, the second position information is calculated on the basis of another pair of burst data which can be detected from the target position, and the burst position conversion coefficient is adjusted such that discontinuity between the first and second position information. When this adjusting operation is repeated, the true value of the burst position conversion coefficient optimum for a target head can be easily calculated.

In this manner, since position detection sensitivity depending on a variation in head width can be easily corrected, degradation of positioning characteristics caused by a variation in positioning control gain can be prevented. In a device in which a data recording head such as an MR (Magneto-Resistive) head and a data reproducing head are independently arranged, when data is recorded/reproduced in an off-track state (positioned to a position spaced apart from the track center), the head can be controlled to be positioned to a correct off-track position.

A head is generally arranged on each side of the disk, and the head widths of heads may be different from each other. For this reason, a series of processes for adjusting the burst position conversion coefficient to a true value are performed to each head, a correct burst position conversion coefficient which represents differences between the head widths of the heads is preferably calculated.

When a series of processes for adjusting the burst position conversion coefficient to the true value are performed at the start of the device, a burst position conversion coefficient optimum for states such as the latest head width can be set. However, since the head width does not generally change with time, the following manner may be used. That is, the adjusting process is performed once in only manufacturing of the device, the adjustment result is stored in a nonvolatile memory of the device, the burst position conversion coefficient stored in the nonvolatile memory is used in positioning control in ordinary use of the device. In this case, the burst position conversion coefficient need not be performed at the start of the device, and a period of start time can be shortened.

In addition, according to the present invention, a new positioning control section is not required for adjusting the head position, because another pair of burst data is detected and compared with the target track position during performing normal positioning control using one pair of burst data.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

An embodiment in which the present invention is applied to a magnetic disk device will be described below with reference to the accompanying drawings.

Figure 6:
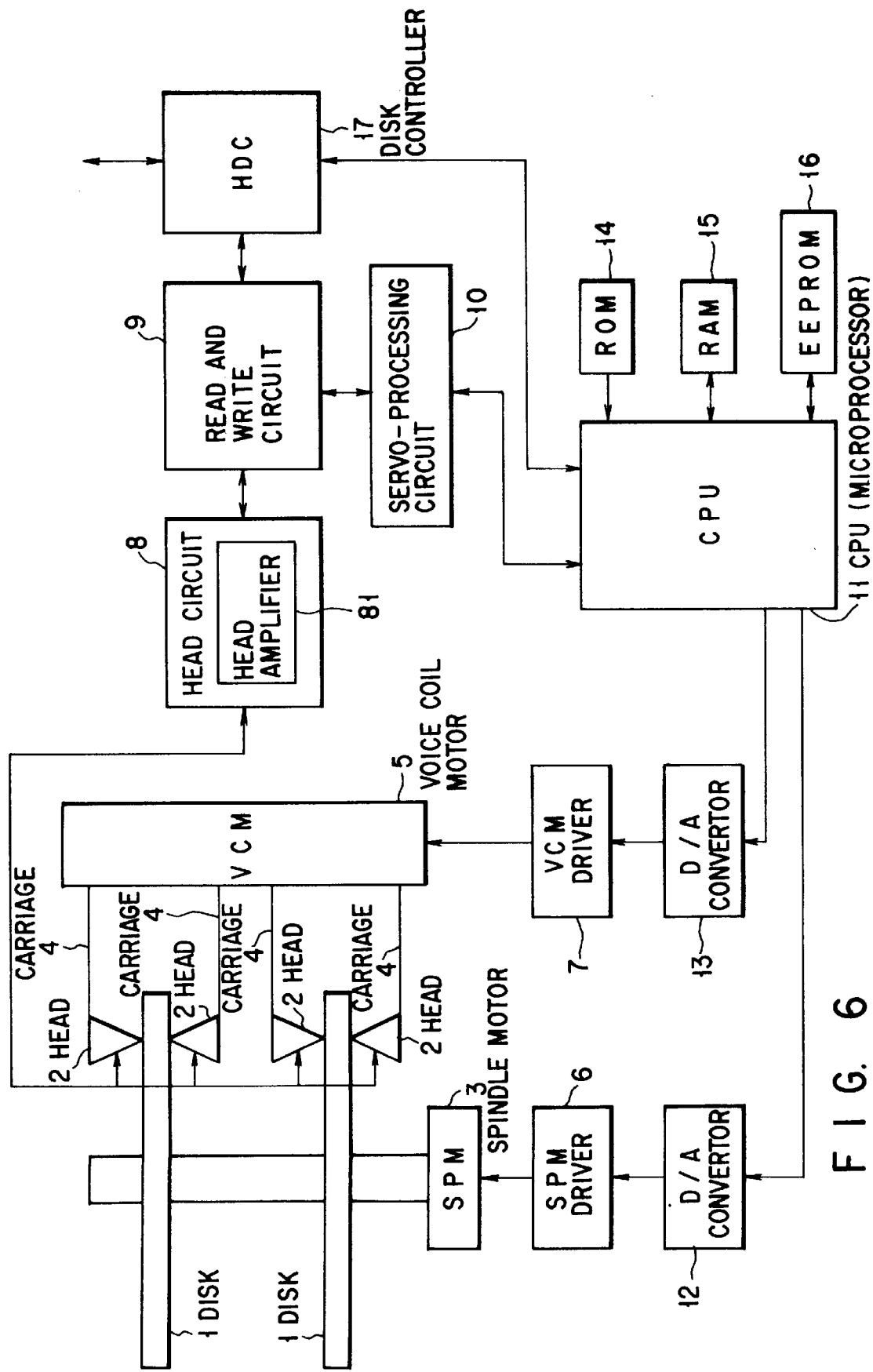
FIG. 6 is a block diagram showing the arrangement of a magnetic disk device according to an embodiment of the present invention.

FIG. 6 is a block diagram showing the arrangement of a magnetic disk device according to an embodiment of the present invention.

A disk (magnetic disk) 1 is a medium on which data is recorded. A head (magnetic head) 2 is arranged for each data surface of the disk 1, and is used to write data in the disk 1 (data recording) and to read data from the disk 1 (data reproducing).

Figure 1:
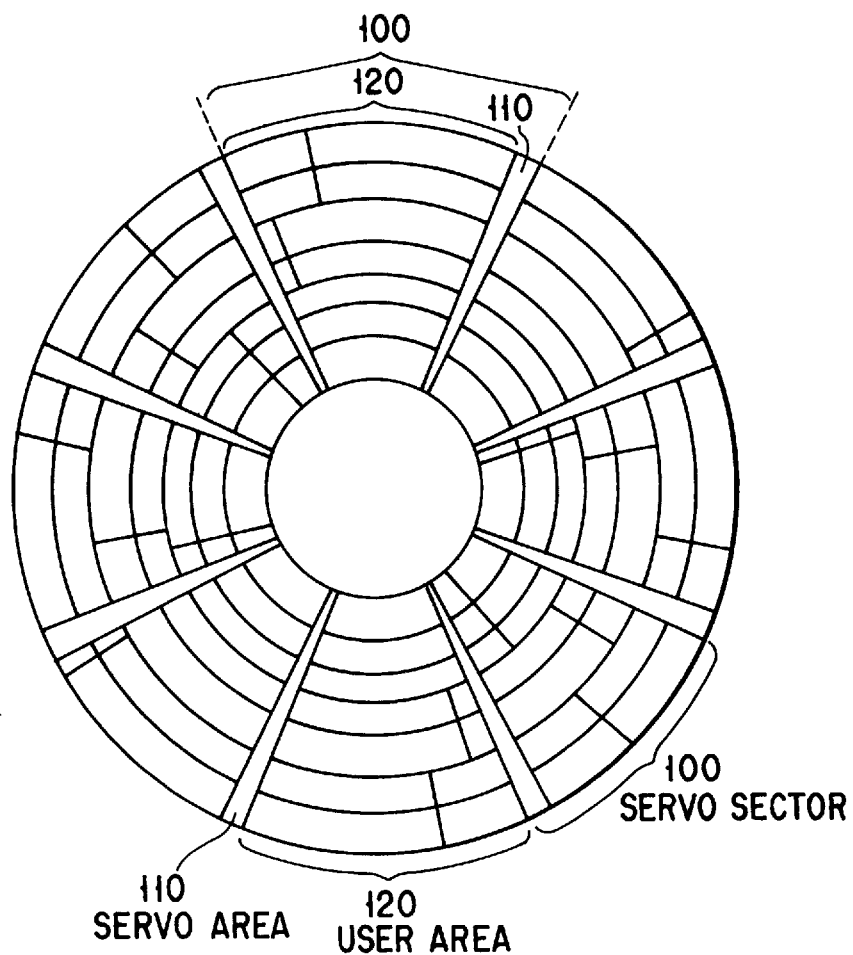
FIG. 1 is a concept view showing a typical format of a disk.
Figure 2:
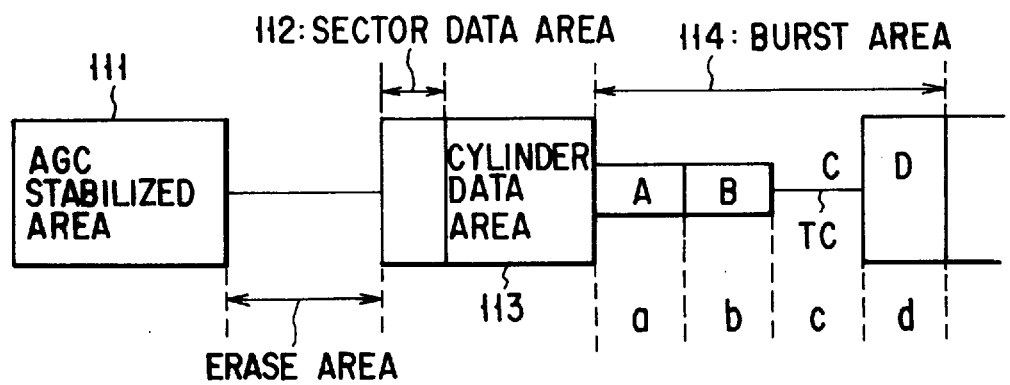
FIG. 2 is a view showing a format of a servo area 110 in FIG. 1.
Figure 3:
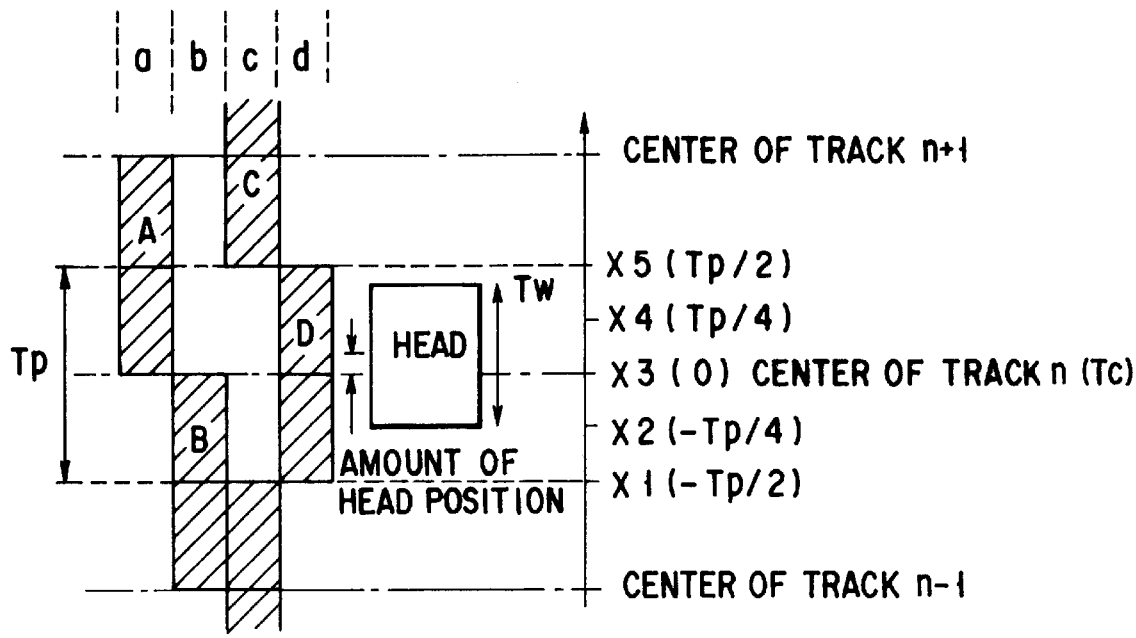
FIG. 3 is a view showing burst data recorded on a disk and a head position.

The format of the disk 1 is the same as the conventional format shown in FIG. 1. More specifically, a plurality of tracks are concentrically formed on both the surfaces of the disk 1, and each track is divided into a plurality of sectors (servo sectors) 100. Each servo sector 100 is constituted by a servo area 110 on which servo data is recorded and a user area 120 on which data is recorded. The servo area 110, as shown in FIG. 2, has an AGC stabilized area 111, a sector data area 112, a cylinder data area 113, and a burst area 114. The burst area 114 is constituted by areas a, b, c, and d for recording position error signals (burst signals) A, B, C, and D. As shown in FIG. 3, the position error signals A and B are a pair of burst signals which are recorded at positions shifted from each other by a half track with reference to a track center (Tc) and have different phases, and the position error signals C and D are a pair of burst signals which are recorded at positions having the track center (Tc) as a reference and have different phases.

The disk 1 is rotated at a high speed by a spindle motor (SPM) 3. The head 2 is attached to a head moving mechanism called a carriage 4, and moves in the radius direction of the disk 1 by movement of the carriage 4. The carriage 4 is driven by a voice coil motor (VCM) 5.

The SPM 3 is connected to a SPM driver 6 for flowing a control current into the SPM 3 to drive the SPM 3, and the VCM 5 is connected to a VCM driver 7 for flowing the control current to the VCM 5 to drive the VCM 5. The value (control amount) of the control current is determined by a calculating process of a CPU (microprocessor) 11, and is given by an analog value.

Each head 2 is connected to a head circuit 8 mounted on, e.g., a flexible printed circuit board (FPC). This head circuit 8 has a head amplifier 81 for amplifying an analog output read by the head 2.

The head circuit 8 is connected to a read and write circuit 9. The read and write circuit 9 receives the analog output (read signal from the head 2) amplified by the head amplifier 81 in the head circuit 8, and performs a signal processing required for a data reproducing operation, e.g., a signal processing for converting an analog output to NRZ data. The read and write circuit 9 also performs a signal processing required for a data recording operation, e.g., a signal processing for modulating the NRZ data (write data) transmitted from a disk controller (HDC) 17 to convert the NRZ data into data (e.g., 2–7 and 1–7 modulation data) written in the disk 1.

The read and write circuit 9 also executes a recording and reproducing processing of the above ordinary data and a reproducing processing (a processing of extracting a data pulse by pulse peak detection which is performed to a read signal from the head 2, and a processing of sample-holding the peak of the read signal to output an analog signal including a burst signal) of information (servo data) in a burst area 114 required for a servo process such as head positioning control.

The read and write circuit 9 is connected to a servo-processing circuit 10 for executing a signal processing required for a servo process. The servo-processing circuit 10 has a decode function of extracting and decoding cylinder data (cylinder number) or the like from the data pulse (servo data included therein) from the read and write circuit 9.

Figure 7:
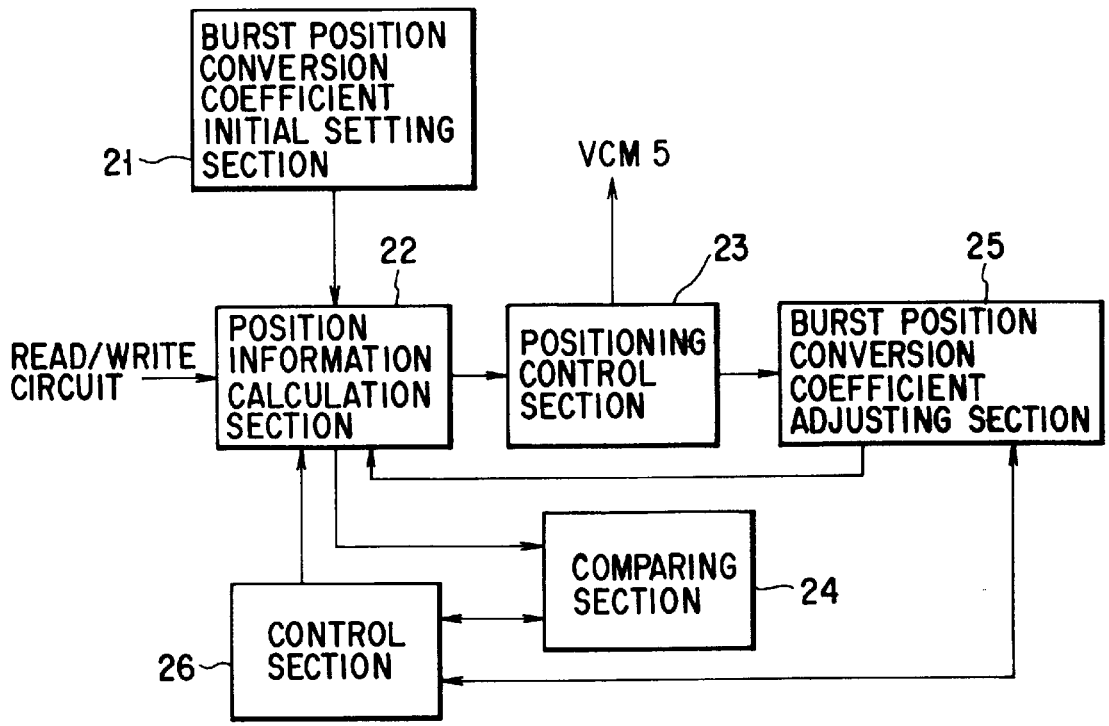
FIG. 7 is a block diagram showing the details of the functions of a CPU 11 according to the present invention.

The CPU 11 is constituted by, e.g., a one-chip microprocessor. FIG. 7 is a block diagram showing the details of the functions of the CPU 11 according to the present invention.

The CPU 11 constitutes a servo processing system (head positioning control mechanism) for executing head positioning control with the servo-processing circuit 10, and the CPU 11 reads cylinder data extracted from the servo-processing circuit 10 from the servo-processing circuit 10 and reads the sample hold data of the peak value of a burst signal from the read and write circuit 9 to calculate a present position. The CPU 11 performs the head positioning control and transfer control of read/write data by controlling the HDC 17.

The CPU 11 also performs a burst position conversion coefficient adjusting process in the following manner. In a state wherein the head is positioned to a target position on the basis of first position information calculated from the pair of burst data A and B of the pairs of burst data group A, B and group C, D (position error signals) recorded on the disk 1, the CPU 11 calculates second position information calculated from the other pair of data C and D which can be detected from the target position, and the burst position conversion coefficient K is adjusted such that the discontinuity between the first and second position information is eliminated.

A D/A converter 12 for converting a control amount obtained by a servo process, i.e., data representing the value of a current to be flown to the SPM 3 by the SPM driver 6, into analog data to output the analog data to the SPM driver 6 and a D/A converter 13 for converting data representing the value of a current to be flown to the VCM 5 by the VCM driver 7 into analog data to output the analog data to the VCM driver 7 are connected to the CPU 11.

A ROM (Read Only Memory) 14 in which control programs or the like of the CPU 11 are stored, a RAM (Random Access Memory) 15 serving as an erasable and programmable, volatile memory which provides a work area or the like of the CPU 11, and an EEPROM (Electrically Erasable and Programmable Read Only Memory) 16 serving as an erasable and programmable, nonvolatile memory are also connected to the CPU 11. The EEPROM 16 is used to reserve control parameters (table for parameters such as the number of data sectors of each servo sector 100, offset between the servo area 110 and the start data sector in the sector 100, and intervals between data sectors) for the magnetic disk device. When the disk 1 applies (format of) a CDR (Constant Density Recording) scheme, i.e., when a CDR scheme in which the disk 1 is divided into a plurality of zones and the numbers of constituent data sectors of the respective zones are different from each other is used, the parameters are stored in each servo sector in units of zones.

The HDC 17 constitutes an interface between a host device and a magnetic disk device, and mainly transfers read/write data.

An operation according to the present invention will be described below with reference to FIG. 6.

In the magnetic disk device in FIG. 6, in order to position the head 2 to a target cylinder position, as described above, position information must be acquired on the basis of burst data of servo data recorded on the disk 1. However, the obtained position information has an error because a variation in head width Tw of the head 2 or the like. In order to correct the position information, a burst position conversion coefficient K must be calculated. This conversion coefficient K can be determined by the head width Tw and track pitch Tp of the head 2. However, when the head width Tw and the track pitch Tp are decreased to increase the recording density of the disk 1, the allowable error of the head width Tw decreases accordingly. For this reason, a burst position conversion coefficient K optimum for the head 2 cannot be easily set.

In this embodiment, a burst position conversion coefficient in a device operation state is set in the first seek at the start of the device, and position information (representing a head position shifted from a track center) obtained by using a pair of burst data (one pair of position error signals) is compared with position information (representing a head position shifted from the track center) obtained by using another pair of burst data (one pair of position error signals). An operation of changing the burst position conversion coefficient K such that both the position information are equal to each other is repeated to adjust (set) the burst position conversion coefficient K to a true value matched with the head 2 used in the device. Note that first seek means a head moving operation in which the head 2 is moved from a specific zone, at which the head 2 is located in a non-operation state (rotation stop state of the disk 1) and which is called a CSS (Contact Start Stop) zone in which servo information is not recorded, to data zone (on which servo data is recorded).

Figure 8:
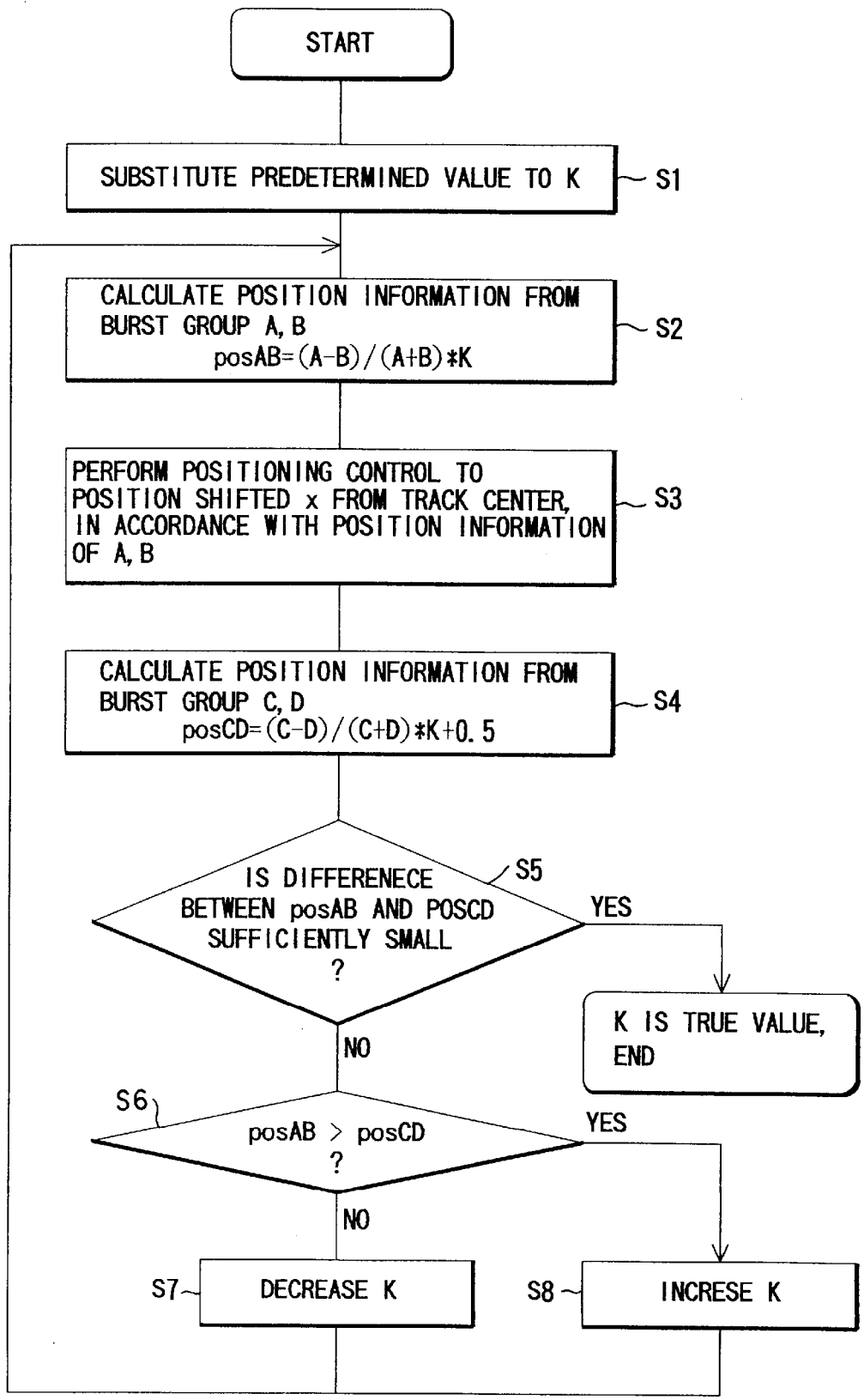
FIG. 8 is a flow chart for explaining a burst position conversion coefficient adjusting process in this embodiment.

A burst position conversion coefficient adjusting (setting) process in the first seek at the start of the device will be described below with reference to FIGS. 6 to 8.

A burst position conversion coefficient initial setting section 21 initially sets a burst position conversion coefficient of a reference (standard) defined by the head width Tw and the track pitch Tp determined in a design specification as (burst position conversion coefficient) K corresponding to the head 2 on the target side of the disk 1 (step S1). This burst position conversion coefficient K is transmitted to a position information calculating section 22.

In the CPU 11 in such a state, a head moving operation in which the head 2 is moved from the CSS zone to the data zone on the disk 1 is performed.

At this time, information recorded on the disk 1 is read by the head 2. A read signal (analog output) serving as a read output of the head 2 is amplified by (the head amplifier 81 in) the head circuit 8 to supply the amplified signal to the read and write circuit 9.

In the read and write circuit 9, a data pulse (which may include such as cylinder data in the servo data) is extracted by pulse peak detection from the read signal amplified by the head circuit 8 and output from the head 2. In the read and write circuit 9, the read signal from the head 2 is sample-held to output an analog signal including a burst signal. The analog signal including the burst signal is converted into digital data by an A/D converter (not shown) to transmit the digital data to the CPU 11.

The data pulse extracted by the read and write circuit 9 is transmitted to the servo-processing circuit 10. The servo-processing circuit 10 receives the data pulse to decode the data pulse, and extracts and decodes cylinder data, etc., (in servo data). If the cylinder data, etc., (in servo data) can be normally decoded, the servo-processing circuit 10 transmits the decoded cylinder data, etc., (in servo data) to the CPU 11.

The CPU 11 controls the driving operation of the VCM 5 (through the D/A converter 13 and the VCM driver 7) on the basis of the cylinder data (in the servo data) transmitted from a servo processing circuit 20 to move the head 2 on a target cylinder.

When the head 2 moves to the target cylinder, the position information calculating section 22 calculates first position information posAB representing head position shifted from the track center of the head 2 on the basis of, of peak hold signals of amplitudes of burst signals transmitted from the read and write circuit 9 (through an A/D converter (not shown)), i.e., sample hold signals corresponding to the peak values of reproduced outputs of the position error signals A, B, C, and D from the areas a, b, c, and d of the burst area 114, the sample hold signals of the reproduced outputs from, e.g., the position error signals A and B (step S2). More specifically, when the burst outputs which are the sample hold signals of the reproduced outputs from the position error signals A and B are represented by A and B, respectively, on the basis of the burst outputs A and B and the burst position conversion coefficient K at this time, the position information calculating section 22 calculates the first position information posAB is calculated by:

$$posAB = \{(A-B)/(A+B)\} \times K.$$

On the basis of the first posAB calculated on the basis of one pair of burst outputs A and B, a positioning control section 23 performs positioning control to the head 2 to position the head 2 to a position X (x=(Tp−Tw)/2<x<Tw/2, and, when Tp=4.0 μm and Tw=3.0 μm, Tp/8<x<3Tp/8) shifted from the track center of the target cylinder by x (μm) (step S3). The positioning control is performed in such a manner that the driving operation of the VCM 5 to is controlled to move the head 2 by a small distance so that an amount of misregistration represented by posAB becomes x. In this case, the value of x (head position shifted from the track center) may be determined by the system in advance, or may be arbitrarily selected and designated within the range of (Tp−Tw)/2<x<Tw/2.

Figure 4:
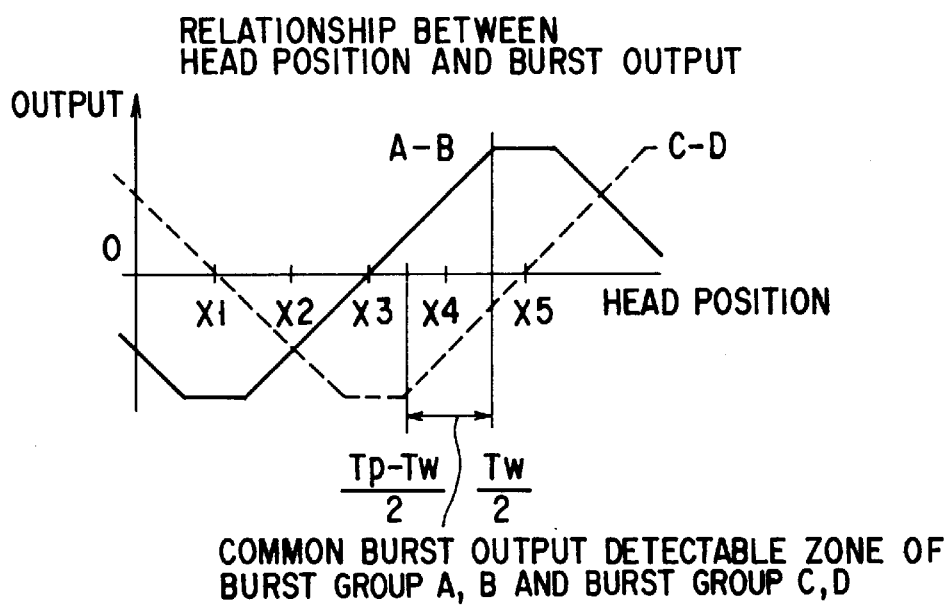
FIG. 4 is a graph showing the relationship between a head position and two pairs of burst outputs obtained when the burst data in FIG. 3 is applied.
Figure 5:
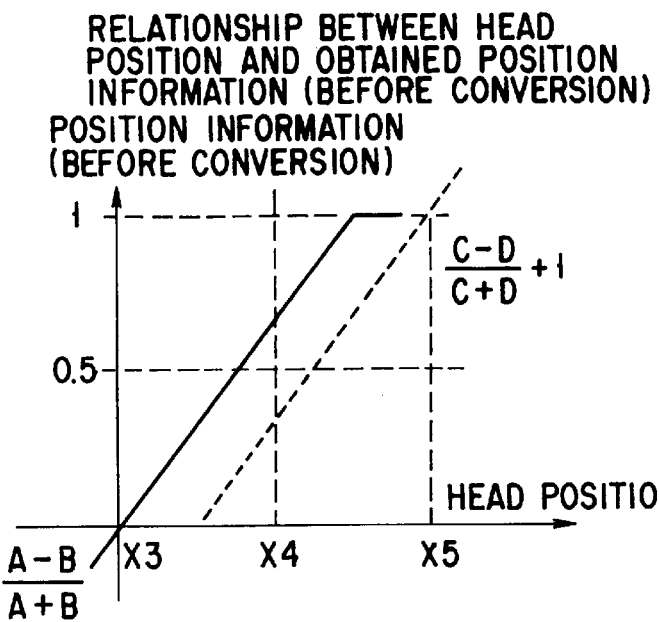
FIG. 5 is a graph showing the relationship between a head position obtained when the burst data in FIG. 3 is applied and position information (position information before conversion by a burst position conversion coefficient K) obtained from two pairs of burst outputs.

The reason why the amount of misregistration x from the track center of the position to which the head 2 is to be positioned is limited to the range of (Tp−Tw)/2<x<Tw/2 is as follows. That is, in this range, as is apparent from FIG. 4, the pair of burst outputs A and B and the pair of burst outputs C and D are outside the blind band, i.e., are in a burst output detectable band, and both the pairs of burst outputs A and B and C and D can be used.

When positioning control of the head 2 to the position X (target position) shifted from the center of the target cylinder by x is performed by the positioning control section 23 (accurately, when the head 2 is positioned to a position represented by posAB=x), the position information calculating section 22 calculates second position information posCD representing head position shifted from the track center of the head 2 on the basis of, of peak hold signals of amplitudes of burst signals read from the head 2 and transmitted from the read and write circuit 9, the sample hold signals of the reproduced outputs from, e.g., the position error signals C and D (step S4). More specifically, when the burst outputs which are the sample hold signals of the reproduced outputs from the position error signals C and D are represented by C and D, respectively, on the basis of the burst outputs C and D and the burst position conversion coefficient K at this time, the position information calculating section 22 calculates the second position information posCD is calculated by:

$$posCD = \{(C-D)/(C+D)\} \times K + 0.5 \text{ (tracks)}$$

When the head 2 is to be positioned to the position (target position) X shifted from x from the track center of the target cylinder by using the burst outputs A and B, depending on the value of the burst position conversion coefficient K to be used, the position to which the head 2 is actually positioned does not always coincide with the target position. This phenomenon will be described below by using a case wherein x=Tp/4 (μm)=¼ (track) (i.e., X=X4) with reference to FIGS. 9 to 11.

Figure 9:
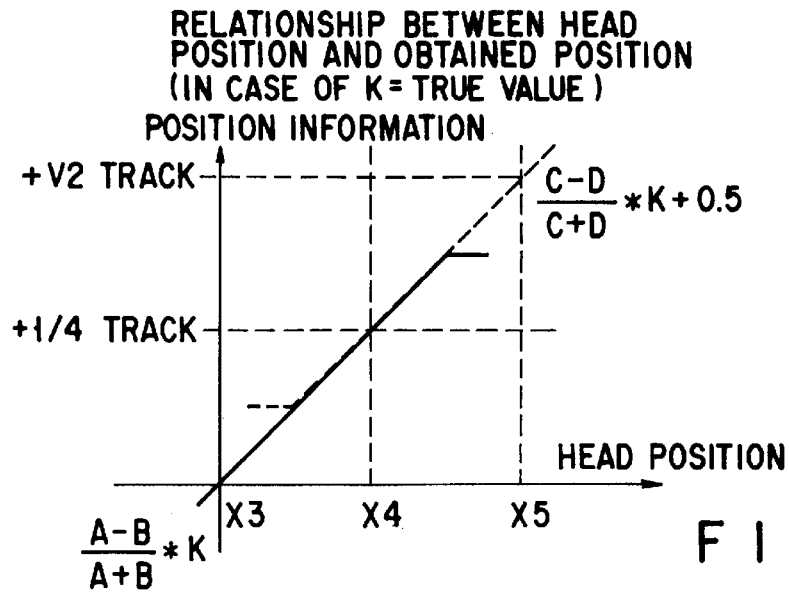
FIG. 9 is a graph showing an example of the correspondence between a head position obtained when the burst position conversion coefficient K is equal to a true value and each position information (position information after conversion by the burst position conversion coefficient K)

In case of K=true value, the actual position of the head 2 coincides with the target position X4 (position X4 shifted from a track center X3 by ¼ (track)) as shown in FIG. 9, and the value of the first position information posAB calculated by using the burst outputs A and B coincides with the value of the second position information posCD calculated by using the burst outputs C and D.

Figure 10:
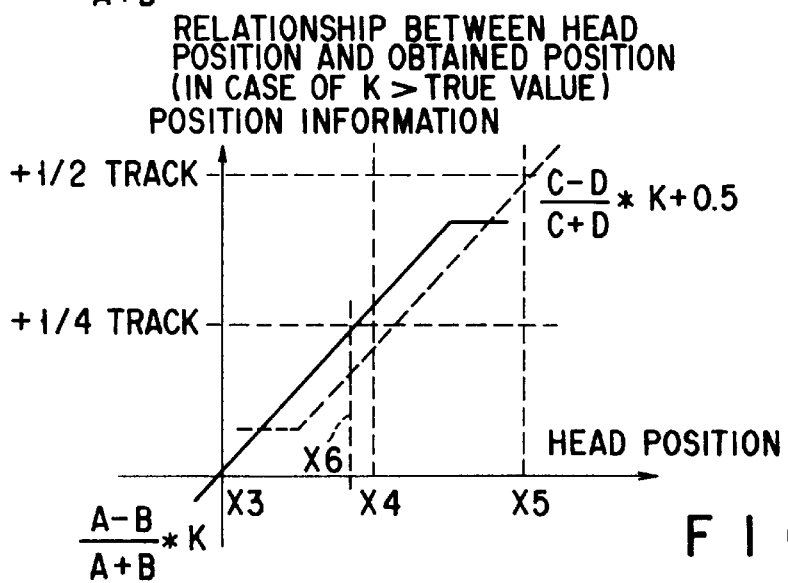
FIG. 10 is a graph showing an example of the correspondence between a head position obtained when the burst position conversion coefficient K is larger than the true value and each position information (position information after conversion by the burst position conversion coefficient K)

In case of K>true value, the value of the actual position of the head 2 is smaller than the value of the target position X4 as indicated by X6 in FIG. 10, and the value of the second position information posCD is smaller than ¼ track (value of the first position information posAB).

Figure 11:
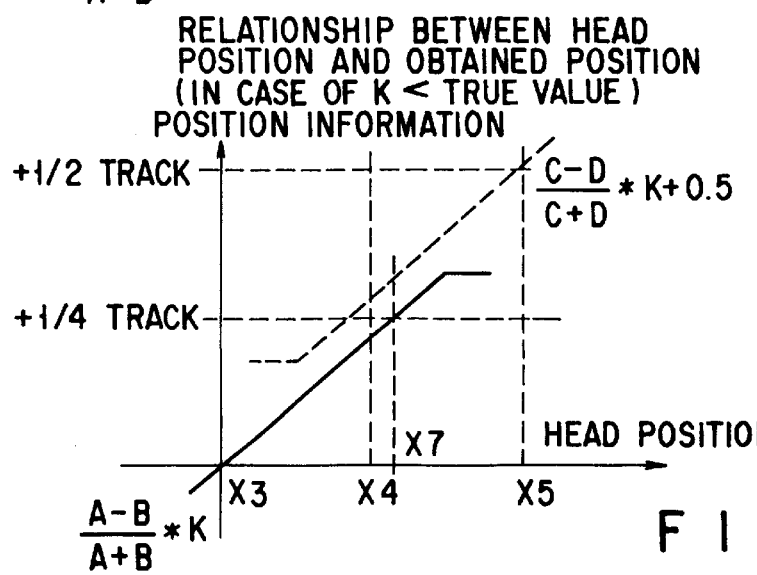
FIG. 11 is a graph showing an example of the correspondence between a head position obtained when the burst position conversion coefficient K is smaller than the true value and each position information (position information after conversion by the burst position conversion coefficient K).

In case of K<true value, the value of the actual position of the head 2 is larger than the value of the target position X4 as indicated by X7 in FIG. 11, and the value of the second position information posCD is larger than ¼ track (value of the first position information posAB).

According to the above description, a comparing section 24 compares the value of the first position information posAB with the value of the second position information posCD calculated by using the burst outputs (from the head 2) when the head 2 is positioned such that the value of the position information posAB (steps S5 and S6). If the difference exceeds an error Δ, when the value of the position information posCD is large, the burst position conversion coefficient adjusting section 25 decreases the burst position conversion coefficient K by a predetermined value (step S7); when the value of the position information posCD is small, the burst position conversion coefficient adjusting section 25 increases the burst position conversion coefficient K by a predetermined value (step S8). The control section 26 performs processes (including positioning control which is performed again) following step S2 by using a new burst position conversion coefficient K.

The control section 26 repeats the above processes until the difference between the value of the first position information posAB obtained from the pair of burst outputs A and B and the value of the second position information posCD obtained from the other pair of burst outputs C and D (i.e., the difference between the values of the first position information posAB and the second position information posCD) falls within the range of the error Δ.

If the difference between the values of the position information posAB and the position information posCD falls within the range of the error Δ (step S5), the CPU 11 recognizes that the true value of the burst position conversion coefficient K can be obtained, and registers the burst position conversion coefficient K obtained at this time in a predetermined area of the RAM 15 to end the process.

The CPU 11 performs the above process to all the heads 2 (four heads 2 in FIG. 6) of the device to register the true values (adjusted values) of the burst position conversion coefficients K calculated for the respective heads 2 in the predetermined area of the RAM 15. In this manner, in positioning control of the head 2 after the device is started, position information is calculated by using a burst position conversion coefficient K unique to the head 2 registered in the RAM 15, thereby realizing correct positioning control.

The above process (adjusting process) of calculating the true value of the burst position conversion coefficient K may be performed by using an average of position information of one or more rotations of the disk 1. In this case, a variation in adjusted value can be prevented.

Adjustment (setting) of the burst position conversion coefficient K for each head 2 is not performed at the start of the device, but is performed in manufacturing the device (only once), and the adjustment result (true value of the burst position conversion coefficient K calculated for each head 2) may be registered in the EEPROM 16 (such as nonvolatile memory). In this case, since the process of adjusting the burst position conversion coefficient K at the start of the device, a period of start time can be shortened. In addition, a new burst position conversion coefficient K may be calculated each time the device is started (or manually or automatically calculated a predetermined period of time after) in such a manner that the burst position conversion coefficient K previously set is used as an initial value. In this case, a time required to calculate the burst position conversion coefficient K is shortened.

As the above embodiment, two pair of burst data are described. However, the present invention can be applied to a case wherein three or more pairs of burst data. In this case, in a state wherein a head is positioned to an arbitrary position in a burst data detectable band by position information calculated from one pair of the three pairs of burst data, position information is calculated from another pair of burst data having the arbitrary position as a burst data detectable band, and the burst position conversion coefficient is adjusted such that the two pieces of position information coincide with each other.

In the above embodiment, a magnetic disk device is described. However, the present invention can be applied to a general data recording/reproducing device which performs positioning control to a head on the basis of servo data recorded on a disk such that the disk is positioned to a target position on the disk.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data recording/reproducing device for performing positioning control of at least one head using a plurality pairs of burst data recorded on a disk, comprising:

burst position conversion coefficient initial setting means for initially setting a burst position conversion coefficient;

position information calculating means for calculating position information representing a head position shifted from a track center on the basis of one pair of the plurality pairs of burst data and a burst position conversion coefficient obtained at this time;

positioning control means for positioning the head to an arbitrary position, at which the pair of burst data used for calculation of the position information can be detected, on the basis of the position information calculated by said position information calculating means;

comparing means for comparing first position information indicating a current head position at which said burst position is detectable, with second position information after the head is moved to a predetermined position by said positioning control means on the basis of said first information; and burst position conversion coefficient adjusting means for adjusting the burst position conversion coefficient on the basis of a comparison result of said comparing means such that the difference between the first position information and the second position information is equal to or smaller than a predetermined value.

2. A data recording/reproducing device according to claim 1, further comprising storing means for storing the burst position conversion coefficient adjusted by said burst position conversion coefficient adjusting means.

3. A data recording/reproducing device according to claim 2, wherein positioning of the head is performed on the basis of the burst position conversion coefficient stored in said storing means.

4. A data recording/reproducing device according to claim 1, wherein the head comprises a plurality of heads, and adjustment of the burst position conversion coefficient is performed to each of the plurality of heads.

5. A burst position conversion coefficient setting method in a data recording/reproducing device which performs positioning control of at least one head using a plurality pairs of burst data recorded on a disk, comprising:

a first step of initially setting a burst position conversion coefficient;

a second step of calculating a first position information representing a head position shifted from a track center on the basis of one pair of the plurality pairs of burst data and a burst position conversion coefficient at this time;

a third step of positioning the head to an arbitrary position, at which the pair of burst data used for calculation of the position information can be detected, on the basis of the first position information calculated in the second step;

a fourth step of calculating second position information representing a head position shifted from the track center on the basis of another pair of burst data of the plurality pairs of burst data, which can be detected from the target position in a state wherein the head is positioned to the target position in the third step, and a current burst position conversion coefficient;

a fifth step of comparing the first position information calculated in the third step with the second position information calculated in the fourth step;

a sixth step of adjusting, if a comparison result exceeds a predetermined value in the fifth step, the burst position conversion coefficient to decrease a difference between the first position information and the second position information; and a seventh step of repeating the second to fourth steps until the difference is equal to or less than a predetermined value.

6. A burst position conversion coefficient setting method according to claim 5, further comprising a step of setting the adjusted burst position conversion coefficient in advance and storing the set burst position conversion coefficient.

* * * * *